US012654294B2

(12) United States Patent
Ni

(10) Patent No.: US 12,654,294 B2
(45) Date of Patent: Jun. 16, 2026

(54) IMPACT TOOL

(71) Applicant: Nanjing Chervon Industry Co., Ltd., Nanjing (CN)

(72) Inventor: Lianghua Ni, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/882,874

(22) Filed: Sep. 12, 2024

(65) Prior Publication Data

US 2025/0135612 A1 May 1, 2025

(30) Foreign Application Priority Data

Oct. 25, 2023 (CN) ........................ 202311397040.X

(51) Int. Cl.
*B25B 23/147* (2006.01)
*B25B 21/02* (2006.01)

(52) U.S. Cl.
CPC ............ *B25B 23/147* (2013.01); *B25B 21/02* (2013.01)

(58) Field of Classification Search
CPC .... B25B 23/147; B25B 21/02; B25B 23/1475
See application file for complete search history.

(56) References Cited

U.S. PATENT DOCUMENTS 6,680,595 B2 * 1/2004 Ito ........................ B25B 23/1475 173/4
9,555,527 B2 * 1/2017 Chen ........................ B25F 5/00
2007/0000676 A1 * 1/2007 Arimura ............. B25B 23/1405 173/179
2009/0250233 A1 * 10/2009 Wallace .............. B25B 23/1405 173/183
2011/0000688 A1 * 1/2011 Iwata .................... H02P 29/032 700/170
2012/0279736 A1 * 11/2012 Tanimoto ............. B25B 21/026 173/117
2014/0042951 A1 2/2014 Chen
2014/0332242 A1 * 11/2014 Chen .................. B25B 23/1475 173/20
2019/0319563 A1 * 10/2019 Kato ......................... H02P 6/28
2020/0161994 A1 * 5/2020 Ni ....................... B25B 23/1475
(Continued)

FOREIGN PATENT DOCUMENTS

JP 2014121765 A 7/2014

*Primary Examiner* — Shelley M Self
*Assistant Examiner* — Katie L Gerth
(74) *Attorney, Agent, or Firm* — Greenberg Traurig, LLP

(57) ABSTRACT

An impact tool includes: an electric motor; a battery set; an impact mechanism; and a controller. The impact mechanism includes an impact block and a hammer anvil impacted by the impact block. The controller is configured to: after the impact mechanism applies the impact force to the output shaft, determine a required torque value of the electric motor; match a preset voltage value of the electric motor in response to the required torque value; and adjust a running parameter of the electric motor according to a relationship between the preset voltage value of the electric motor and a current voltage value of the battery set so that a difference parameter between an electric motor output torque of the electric motor and the required torque value is less than a preset difference parameter at each of different current voltage values of the battery set.

15 Claims, 10 Drawing Sheets

(56) References Cited

U.S. PATENT DOCUMENTS

| | | | | |
|---|---|---|---|---|
| 2020/0180125 | A1* | 6/2020 | Iwata | B25B 21/026 |
| 2021/0107128 | A1* | 4/2021 | Lu | B25D 17/24 |
| 2021/0119559 | A1* | 4/2021 | Li | B25B 23/147 |
| 2022/0001462 | A1* | 1/2022 | Sunabe | H02P 29/10 |
| 2023/0107745 | A1* | 4/2023 | Shima | B25B 23/1475<br>173/176 |
| 2024/0139919 | A1* | 5/2024 | Dey, IV | B25B 21/026 |
| 2025/0269510 | A1* | 8/2025 | Zheng | B25F 5/00 |

* cited by examiner

IMPACT TOOL

RELATED APPLICATION INFORMATION

This application claims the benefit under 35 U.S.C. § 119(a) of Chinese Patent Application No. 202311397040.X, filed on Oct. 25, 2023, which application is incorporated herein by reference in its entirety.

TECHNICAL FIELD

The present application relates to a power tool and, in particular, to an impact tool.

BACKGROUND

An impact tool refers to a tool capable of outputting rotational movements at a certain impact frequency. Common impact tools include an impact wrench, an impact screwdriver, an impact drill, and the like. The impact wrench is typically used for screwing bolts, nuts, and the like. The impact screwdriver is typically used for loosening or tightening screws and the like. The impact drill is typically used for drilling holes through impact.

To output the rotational movements at a certain impact frequency, the impact tool typically includes an output assembly for outputting a rotational force and an impact assembly for impacting the output assembly cyclically. In addition, the impact tool needs to use a power supply as an energy source. In related technical products, for an impact tool using a direct current power supply as an energy source, the output torque of the impact tool will be affected as the power of the direct current power supply is consumed, which will affect the user experience.

This part provides background information related to the present application, and the background information is not necessarily the existing art.

SUMMARY

An impact tool includes: an electric motor including a drive shaft rotating about a first axis and outputting torque via the drive shaft; a battery set powering at least the electric motor; an output shaft for outputting torque; an impact mechanism for applying an impact force to the output shaft, wherein the impact mechanism includes an impact block driven by the drive shaft and a hammer anvil impacted by the impact block, and the hammer anvil is formed with or connected to the output shaft; and a controller configured to control the electric motor. The controller is configured to: after the impact mechanism applies the impact force to the output shaft, determine a required torque value of the electric motor; match a preset voltage value of the electric motor in response to the required torque value; and adjust a running parameter of the electric motor according to a relationship between the preset voltage value of the electric motor and a current voltage value of the battery set so that a difference parameter between an electric motor output torque of the electric motor and the required torque value is less than a preset difference parameter at each of different current voltage values of the battery set.

In an example, the running parameter of the electric motor includes at least one of a duty cycle of a drive signal of the electric motor and a conduction angle of the electric motor.

In an example, the controller is configured to: when the current voltage value of the battery set is less than the preset voltage value of the electric motor, output a signal instructing the electric motor to increase the duty cycle of the drive signal of the electric motor and/or the conduction angle of the electric motor to the electric motor.

In an example, the controller is configured to: when the current voltage value of the battery set is less than the preset voltage value of the electric motor, calculate a required duty cycle of the electric motor according to the relationship between the current voltage value of the battery set and the preset voltage value of the electric motor; and when the required duty cycle is less than or equal to a preset duty cycle threshold, output a signal to increase the duty cycle of the drive signal of the electric motor to the required duty cycle to the electric motor.

In an example, the controller is configured to: when the required duty cycle is greater than the preset duty cycle threshold, output a signal to increase the duty cycle of the drive signal of the electric motor to the preset duty cycle threshold to the electric motor, and then output the signal to increase the conduction angle of the electric motor to the electric motor based on a difference between the required duty cycle and the preset duty cycle threshold.

In an example, the controller is configured to: when the current voltage value of the battery set is less than the preset voltage value of the electric motor, output the signal to increase the duty cycle of the drive signal of the electric motor to the electric motor until the duty cycle of the drive signal of the electric motor reaches a preset duty cycle threshold or the difference parameter between the electric motor output torque and the required torque value is less than the preset difference parameter.

In an example, the controller is configured to: when the duty cycle of the drive signal of the electric motor reaches a preset duty cycle threshold and the difference parameter between the electric motor output torque and the required torque value is greater than or equal to the preset difference parameter, output the signal to increase the conduction angle of the electric motor to the electric motor.

In an example, the preset voltage value of the electric motor is defined as a voltage of the electric motor at a time when the battery set provides a nominal voltage and the electric motor provides the required torque value.

In an example, the difference parameter includes a ratio of a difference between the electric motor output torque at the current voltage value and the required torque value to the required torque value.

In an example, the preset difference parameter is 20%.

In an example, the controller is configured to: match a preset impact cycle of the impact mechanism in response to the required torque value; and correct, according to a relationship between a current impact cycle of the impact mechanism and the preset impact cycle of the impact mechanism, the running parameter of the electric motor adjusted according to the relationship between the preset voltage value of the electric motor and the current voltage value of the battery set.

In an example, the impact cycle is an interval between two consecutive impacts.

In an example, the preset impact cycle is defined as an impact cycle required by the impact mechanism when the battery set provides a nominal voltage and the electric motor provides the required torque value.

In an example, the controller is configured to: when the current impact cycle of the impact mechanism is longer than the preset impact cycle, output a signal instructing the electric motor to increase a duty cycle of a drive signal of the electric motor and/or a conduction angle of the electric motor to the electric motor.

In an example, the controller is configured to: calculate a required duty cycle of the electric motor according to the relationship between the current impact cycle of the impact mechanism and the preset impact cycle; when the required duty cycle is greater than a preset duty cycle threshold, output a signal to increase the duty cycle of the drive signal of the electric motor to the preset duty cycle threshold to the electric motor; and output, based on a difference between the required duty cycle and the preset duty cycle threshold, the signal to increase the conduction angle of the electric motor to the electric motor.

An impact tool includes: an electric motor including a drive shaft rotating about a first axis and outputting torque via the drive shaft; a battery set powering at least the electric motor; an output shaft for outputting torque to an outside; an impact mechanism for applying an impact force to the output shaft, wherein the impact mechanism includes an impact block driven by the drive shaft and a hammer anvil impacted by the impact block, and the hammer anvil is formed with or connected to the output shaft; and a controller configured to control the electric motor. The controller is further configured to: after the impact mechanism applies the impact force to the output shaft, determine a required torque value of the electric motor, wherein a ratio of a difference between the output torque of the electric motor and the required torque value to the required torque value is lower than 20% at each of different current voltage values of the battery set.

An impact tool includes: an electric motor including a drive shaft rotating about a first axis and outputting torque via the drive shaft; a battery set powering at least the electric motor; an output shaft for outputting torque; an impact mechanism for applying an impact force to the output shaft; and a controller configured to control the electric motor. The controller is configured to: after the impact mechanism applies the impact force to the output shaft, determine a required torque value of the electric motor; match a preset value of a first parameter value of the impact mechanism and a preset value of a second parameter value of the impact mechanism in response to the required torque value; adjust a running parameter of the electric motor according to a relationship between a current first parameter value and the preset value of the first parameter value; correct, according to a relationship between a current second parameter value and the preset value of the second parameter value, the running parameter of the electric motor adjusted according to the relationship between a current first parameter value and the preset value of the first parameter value; and perform running with the corrected running parameter of the electric motor so that a difference parameter between the electric motor output torque of the electric motor and the required torque value is less than a preset difference parameter at each of different current voltage values of the battery set.

In an example, the first parameter value includes a voltage parameter, and the second parameter value includes an impact cycle of the impact mechanism.

In an example, the running parameter of the electric motor includes at least one of a duty cycle of a drive signal of the electric motor and a conduction angle of the electric motor.

In an example, the preset difference parameter is 20%.

DETAILED DESCRIPTION

Figure 1:
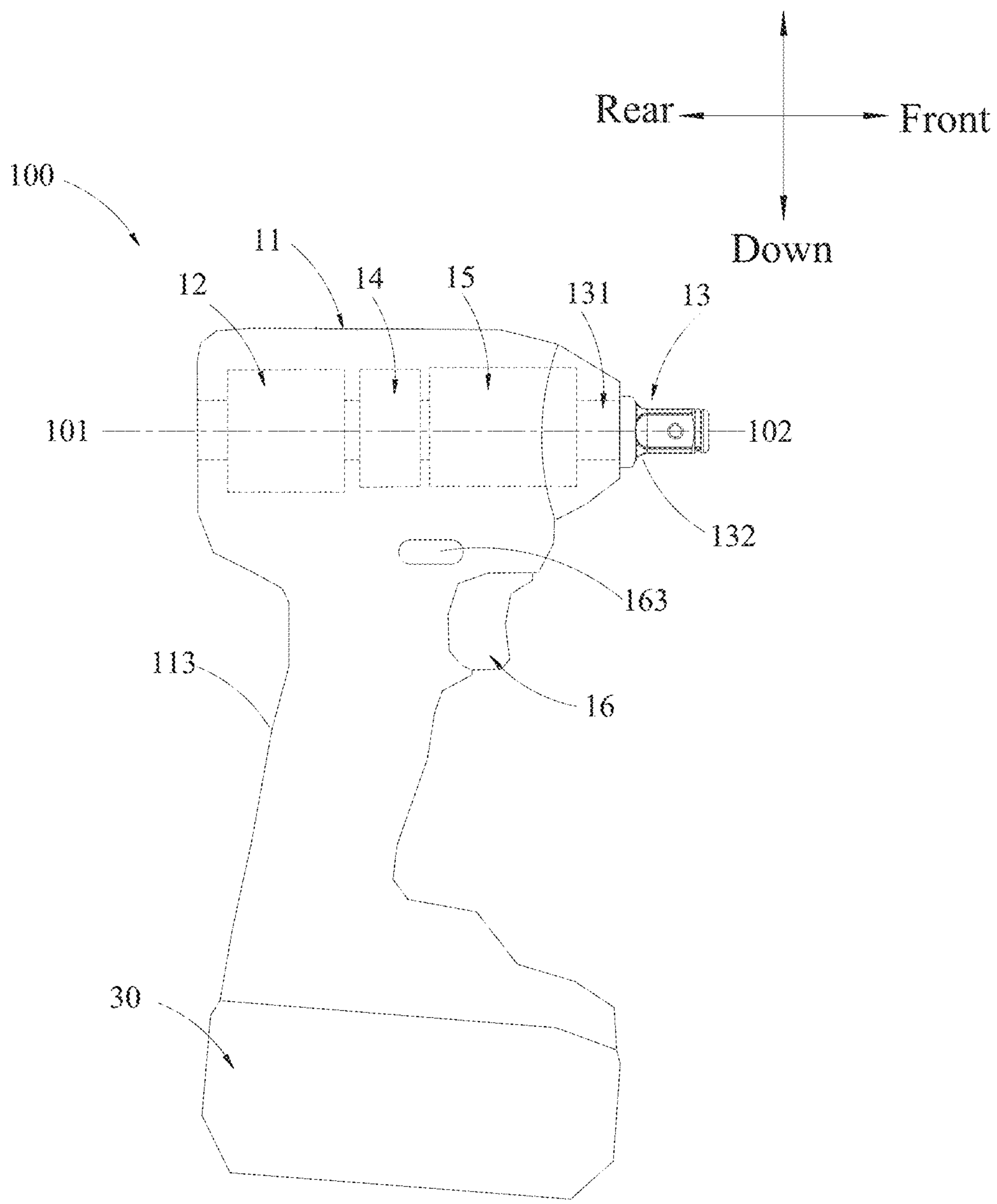
FIG. 1 is a structural view of an impact tool according to an example of the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

To clearly illustrate the technical solutions of the present application, an upper side, a lower side, a left side, and a right side are defined in the drawings of the specification.

Figure 2:
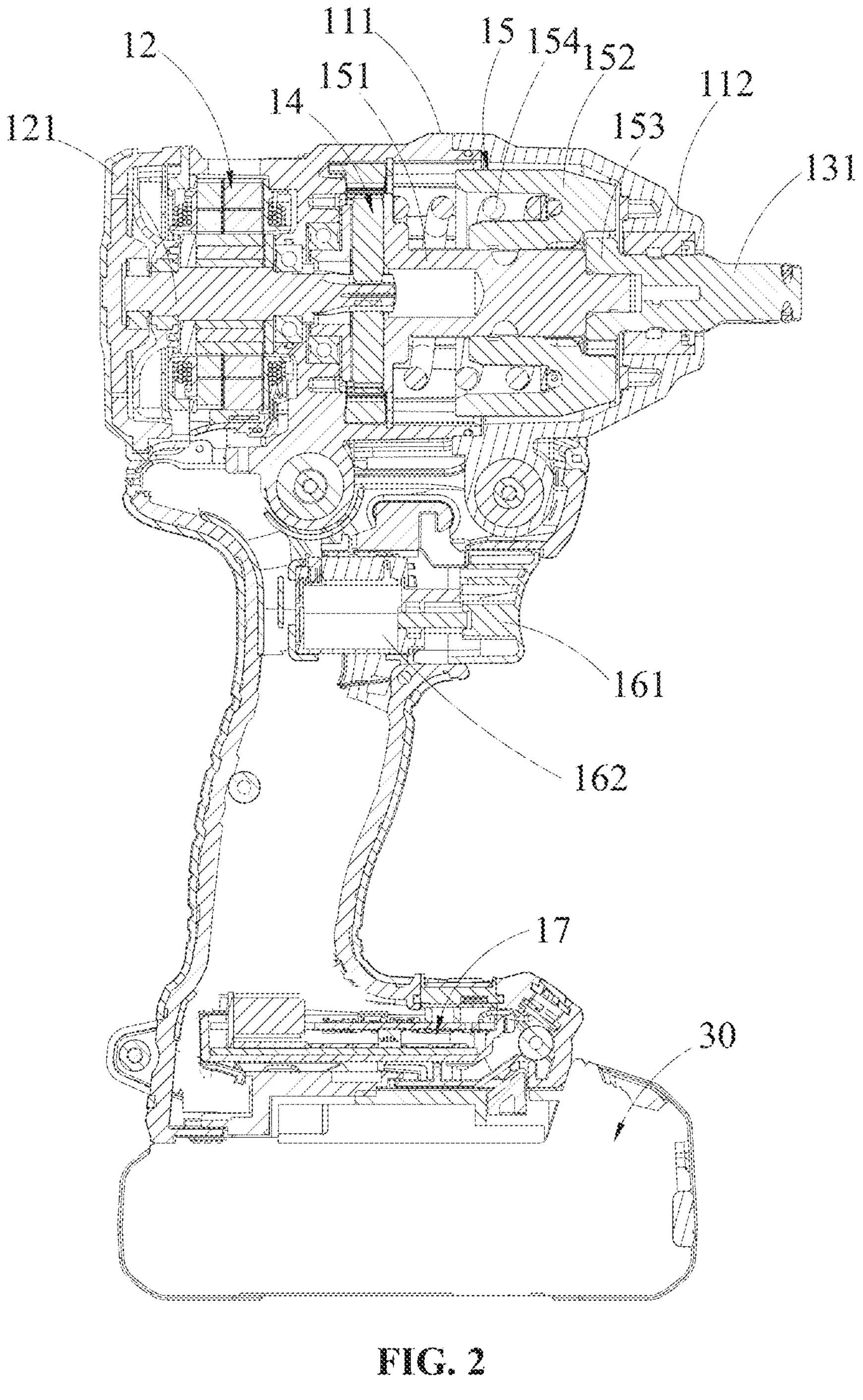
FIG. 2 is a sectional view of the impact tool in FIG. 1.

FIGS. 1 and 2 show an impact tool in an example of the present application. The impact tool is an impact wrench 100. It is to be understood that in other alternative examples, different working accessories may be mounted to the impact tool. The impact tool with one of these different working accessories may be, for example, an impact drill or an impact screwdriver.

The impact wrench 100 includes a power supply. In this example, the power supply is a direct current power supply. The direct current power supply is configured to power the impact wrench 100. The direct current power supply is a battery set 30. The impact wrench 100 is powered by the battery set 30 in conjunction with a corresponding power supply circuit. It is to be understood by those skilled in the art that the power supply is not limited to the direct current power supply, and the corresponding components in the machine may be powered through mains power or an alternating current power supply in conjunction with corresponding rectifier, filter, and voltage regulator circuits. In this example, the direct current power supply is the battery set 30. The battery set may specifically be a battery pack. The battery set 30 is used below instead of the direct current power supply, which is not intended to limit the present application.

As shown in FIGS. 1 and 2, the impact wrench 100 includes a housing 11, a motor 12, an output mechanism 13, a transmission mechanism 14, and an impact mechanism 15. The motor 12 includes a drive shaft 121 rotating about a first axis 101. In this example, the motor 12 is specifically configured to be an electric motor. The electric motor 12 is used below instead of the motor, and an electric motor shaft 121 is used below instead of the drive shaft, which is not intended to limit the present application.

The output mechanism 13 includes an output shaft 131 for connecting a working accessory and driving the working accessory to rotate. A clamping assembly 132 is disposed at the front end of the output shaft 131 and can clamp different working accessories, for example, a screwdriver, a drill bit, and a socket, to implement corresponding functions.

The output shaft 131 is used for outputting torque to the outside so that a fastener is operated. The output shaft 131 rotates about an output axis 102. The first axis 101 coincides with the output axis 102 in this example. In other alternative examples, a certain included angle exists between the output axis 102 and the first axis 101. In other alternative examples, the first axis 101 and the output axis 102 are parallel to each other but do not coincide with each other.

The impact mechanism 15 is used for applying an impact force to the output shaft 131. The impact mechanism 15 includes a main shaft 151, an impact block 152 sleeved on the circumference of the main shaft 151, a hammer anvil 153 disposed at the front end of the impact block 152, and an elastic element 154. The hammer anvil 153 is connected to the output shaft 131. In this example, the hammer anvil 153 includes an anvil, and the output shaft 131 is formed at the front end of the anvil. It is to be understood that the anvil and the output shaft 131 may be integrally formed or separately formed as independent parts.

The elastic element 154 provides a force for the impact block 152 to approach the hammer anvil 153. In this example, the elastic element 154 is a coil spring. A pair of first ball grooves that open forwards and extend backwards along a front and rear direction are provided on the front end surface of the impact block 152. A pair of second ball grooves are formed on the outer surface of the main shaft 151. The impact mechanism 15 further includes rolling balls. The rolling balls straddle the first ball grooves and the second ball grooves so that the impact block 152 is connected to the main shaft 151. In this example, the rolling balls are steel balls.

The housing 11 includes an electric motor housing 111 for accommodating the electric motor 12 and an output housing 112 for accommodating at least part of an output assembly 13. The output housing 112 is connected to the front end of the electric motor housing 111. The housing 11 is further formed with or connected to a grip 113 to be operated by a user. The grip 113 and the electric motor housing 112 form a T-shaped or L-shaped structure, which is convenient for the user to hold and operate. The power supply device 30 is connected to an end of the grip 113.

The transmission mechanism 14 is disposed between the electric motor 12 and the impact mechanism 15 and used for transmitting power between the electric motor shaft 121 and the main shaft 151. In this example, the transmission mechanism 14 is decelerated by a planet gear. The working principle according to which a planet gear performs the deceleration and the deceleration implemented by the transmission mechanism have been completely disclosed to those skilled in the art. Therefore, the detailed description is omitted herein for the brevity of the specification.

When the impact wrench 100 works with no load, the impact mechanism 15 does not impact and plays a transmission role in transmitting the rotation of the electric motor 12 to the output shaft 131. When a load is applied to the impact tool 100, the rotation of the output shaft 131 is blocked. The output shaft 131 may reduce a rotational speed or may completely stop rotating due to a different magnitude of the load. When the output shaft 131 completely stops rotating, the hammer anvil 153 also stops rotating. Due to the limitation of the hammer anvil 153 on the impact block 152 in a circumferential direction, the impact block 152 also stops rotating. However, the main shaft 151 continues rotating such that the rolling balls are pressed to move along ball channels, thereby driving the impact block 152 to be displaced backwards along the axis of the main shaft. At the same time, the elastic element 154 is pressed until the hammer anvil 153 is completely separated from the impact block 152. In this case, the main shaft 151 drives the impact block 152 to rotate at a certain rotational speed, and the elastic element 154 springs back along an axial direction. When the impact block 152 rotates to be in contact with the hammer anvil 153, the impact block 152 applies the impact force to the hammer anvil 153. Under the action of this impact force, the output shaft 131 overcomes the load and continues rotating by a certain angle, and then the output shaft 131 stops rotating again. The preceding process is repeated. Since an impact frequency is high enough, a relatively continuous impact force is applied to the output shaft 131 so that the working accessory works continuously.

Figure 3:
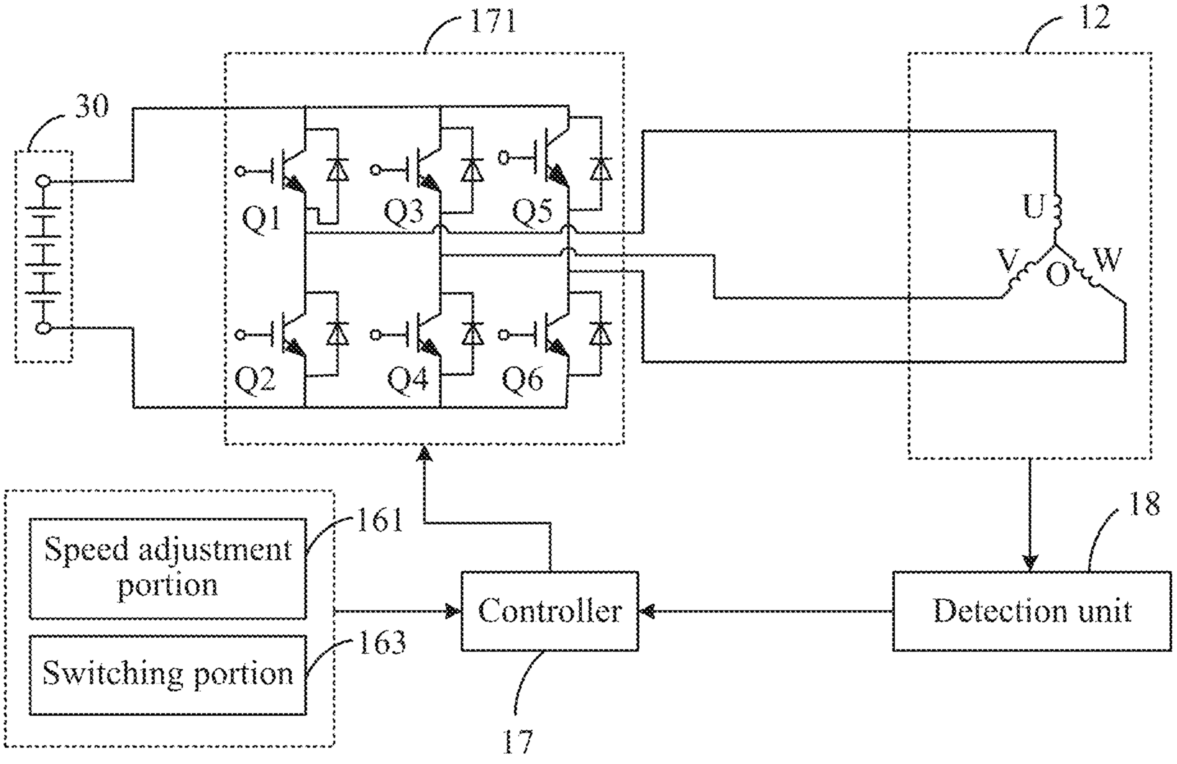
FIG. 3 is a circuit diagram of an impact tool according to an example of the present application.

As shown in FIG. 3, the electric motor 12 includes a stator and a rotor. In some examples, the electric motor 12 is a three-phase brushless motor including a rotor with a permanent magnet and three-phase stator windings U, V, and W that are commutated electronically. In some examples, the three-phase stator windings U, V, and W adopt a star connection. In other examples, the three-phase stator windings U, V, and W adopt a delta connection. However, it is to be understood that other types of brushless motors are also within the scope of the present disclosure. The brushless motor may include less than or more than three phases.

As shown in FIGS. 1 to 3, the impact wrench 100 includes a control mechanism. The control mechanism includes a driver circuit 171 and a controller 17. The driver circuit 171 is electrically connected to the stator windings U, V, and W of the electric motor 12. The driver circuit 171 is configured to transmit the current from the battery set 30 to the stator windings U, V, and W, so as to drive the electric motor 12 to rotate. In an example, the driver circuit 171 includes multiple switching elements Q1, Q2, Q3, Q4, Q5, and Q6. A gate terminal of each switching element is electrically connected to the controller 17 and is configured to receive a control signal from the controller 17. A drain or source of each switching element is connected to the stator windings U, V, and W of the electric motor 12. The switching elements Q1 to Q6 receive control signals from the controller 17 to change their respective on states, thereby changing the current loaded by the battery set 30 to the stator windings U, V, and W of the electric motor 12. In an example, the driver circuit 171 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches, such as the IGBTs or the BJTs.

In this example, the controller 17 is configured to control the electric motor 12. The controller 17 is disposed on a control circuit board. The control circuit board includes a printed circuit board (PCB) and a flexible printed circuit (FPC) board. The controller 17 adopts a dedicated control chip, for example, a single-chip microcomputer or a microcontroller unit (MCU). Specifically, the controller 17 controls the on or off states of the switching elements in the driver circuit 171 through the control chip. In some examples, the controller 17 controls the ratio of an on time of a drive switch to an off time of the drive switch based on a pulse-width modulation (PWM) signal. It is to be noted that the control chip may be integrated in the controller 17 or may be disposed independently of the controller 17. The structural relationship between a driver chip and the controller 17 is not limited in this example.

The impact wrench 100 further includes a power switch 16 and a switching portion 163. The power switch 16 is disposed on the grip 113 for the user to operate. The power switch 16 is configured to control the energization state of the electric motor 12. The switching portion 163 is disposed on the upper side of the main switch 16 and configured to be operated to cause the electric motor 12 to rotate in a forward rotation direction in which the fastener is fastened or screwed or a reverse rotation direction in which the fastener is loosened or unscrewed. In this example, the switching portion 163 is a switching switch.

In this example, the power switch 16 is a travel switch. The travel switch includes a speed adjustment portion 161 to be operated and a slide rheostat 162. Therefore, the rotational speed of the electric motor 12 may also be adjusted by the power switch 16. The rotational speed of the electric motor 12 is adjusted according to a trigger stroke of the speed adjustment portion 161. If the trigger stroke of the speed adjustment portion 161 is different, the slide rheostat 162 outputs a different signal.

The trigger stroke of the speed adjustment portion 161 is positively correlated with the duty cycle of a PWM drive signal of the electric motor 12. The duty cycle of the PWM drive signal is positively correlated with the rotational speed of the electric motor 12. When the trigger stroke of the trigger switch is relatively small, the duty cycle of the PWM drive signal is relatively small, and the rotational speed of the electric motor 12 is also relatively low.

In some examples, the mapping relationship between the triggering stroke of the speed adjustment portion 161 and the PWM drive signal is stored in the impact wrench 100. The mapping relationship may be linear or non-linear, which is not limited in the examples of the present application.

In some examples, the impact wrench 100 further includes a detection unit 18 configured to detect a parameter of the electric motor. The parameter of the electric motor includes at least one of a voltage of the electric motor and a current of the electric motor. The input of the detection unit 18 is electrically connected to the electric motor 12, and the output of the detection unit 18 is electrically connected to the controller 17 so that it is convenient for the controller 17 to acquire the parameter of the electric motor detected by the detection unit 18. In some examples, the detection unit 18 is configured to detect the current of the electric motor and includes a current sense resistor, a Hall current sensor, or a metal-oxide semiconductor field-effect transistor (MOSFET) turn-on resistor. In some examples, the detection unit 18 is configured to detect the voltage of the electric motor and includes one or more of an inductive voltage transformer, a Hall voltage sensor, a voltage-dividing voltage sensor, a fiber-optic voltage sensor, and a resistor divider.

Considering that the output torque of the impact tool is prone to be affected as the power of the direct current power supply is consumed, in some examples, the controller 17 is configured to: after the impact mechanism 15 applies the impact force to the output shaft 131, determine a required torque value of the electric motor 12; and in response to the required torque value matching a preset voltage value of the electric motor, adjust a running parameter of the electric motor according to the relationship between the preset voltage value of the electric motor and a current voltage value of the battery set 30 so that the difference parameter between the electric motor output torque of the electric motor 12 and the required torque value is less than a preset difference parameter at each of different current voltage values of the battery set 30.

The required torque value of the electric motor 12 is defined as torque which the electric motor 12 needs to output to enable the output torque of the output shaft to meet a fastening or disassembly requirement. The required torque value of the electric motor 12 is related to the output torque of the output shaft. In some examples, the required torque of the electric motor 12 is determined according to the user's setting. In some examples, the required torque of the electric motor 12 is determined according to a current or a related parameter in a circuit by a table lookup method. In some examples, the required torque of the electric motor 12 is determined according to the output torque of the output shaft that is calculated in real time. In this example, the preset voltage value of the electric motor is configured to be a voltage of the electric motor 12 at the time when the battery set 30 provides a nominal voltage and the electric motor 12 provides the required torque value. The formula for calculating output power is as follows: P=UI, where P denotes the output power, U denotes a voltage value of the electric motor 12, and I denotes a current of the electric motor 12. When the impact occurs, the magnitude of the current remains almost constant. Therefore, according to the preceding formula, if the voltage applied to the electric motor 12 remains constant, the output power of the electric motor 12 remains substantially constant. Moreover, the output torque is related to the output power. Therefore, the torque generated at the power remains almost constant. Therefore, a torque value of the electric motor 12 is related to the voltage value of the electric motor 12. The preset voltage value of the electric motor may be matched according to the required torque value.

The voltage of the electric motor 12 is provided by the battery set 30 and may be obtained through the detection of bus voltages at two ends of the electric motor 12. Optionally, a phase voltage may be detected, and then the phase voltage is converted into a bus voltage so that the voltage of the electric motor 12 is obtained. The current voltage of the battery set 30 is related to the voltage of the electric motor 12. Therefore, to ensure that the voltage of the electric motor 12 can reach the preset voltage value, the running parameter of the electric motor may be adjusted according to the relationship between the current voltage value of the battery set 30 and the preset voltage value of the electric motor. The running parameter of the electric motor is a parameter with which the voltage of the electric motor 12 can be adjusted. In this example, the running parameter of the electric motor includes at least one of the duty cycle of the drive signal of the electric motor and a conduction angle of the electric motor. It is defined that Ua denotes the voltage of the battery set 30, and the voltage U of the electric motor 12=Ua×the duty cycle of the drive signal of the electric motor. Therefore, the duty cycle of the drive signal of the electric motor may be adjusted according to a variation in Ua so that it is ensured that U remains constant.

The preset difference parameter reflects the proximity of the electric motor output torque of the electric motor 12 to the required torque value. When the difference parameter between the electric motor output torque and the required torque value is less than the preset difference parameter, it is indicated that the electric motor output torque is substantially the same as the required torque value. The type of the preset difference parameter may be set according to requirements, and the size of the preset difference parameter may be set according to different accuracy requirements, which is not specifically limited herein. In some examples, the difference parameter includes the ratio of the difference between the electric motor output torque at the current voltage value and the required torque value to the required torque value. In this example, the preset difference parameter is 20%. In some examples, the preset difference parameter is 15%. In some examples, the preset difference parameter is 10%. In other examples, the preset difference parameter includes a preset difference.

In some examples, the controller 17 is specifically configured to: when the current voltage value of the battery set 30 is less than the preset voltage value of the electric motor, output a signal instructing the electric motor 12 to increase the duty cycle of the drive signal of the electric motor and/or the conduction angle of the electric motor to the electric motor 12.

In the related art, a three-phase brushless BLDC motor is controlled by a six-step commutation method. Optionally, the running manner in which "two phases are turned on and three phases have six states" is adopted. Only two phases of windings are turned on in each working state. In the related, the conduction angle of the three-phase brushless motor is fixed at 120 degrees. The increase in the conduction angle typically refers to that a turn-on phase is added among the stator windings within a 360° commutation cycle. For the three-phase motor, the addition of the turn-on phase among the stator windings refers to the change from the state where two phases of windings are turned on and commute to the state where three phases of windings are turned on and commute, that is, the state where the two phases of windings are turned on is switched to the state where the three phases of windings are turned on. Within the 360° commutation cycle, the longer time the three phases of windings are turned on for, the greater the output power of the electric motor. When the current voltage value of the battery set 30 is less than the preset voltage value of the electric motor, the duty cycle of the drive signal of the electric motor and/or the conduction angle of the electric motor are increased so that the difference parameter between the electric motor output torque of the electric motor 12 and the required torque value is less than the preset difference parameter.

In some examples, the controller 17 is configured to: when the current voltage value of the battery set 30 is less than the preset voltage value of the electric motor, calculate a required duty cycle of the electric motor 12 according to the relationship between the current voltage value of the battery set 30 and the preset voltage value of the electric motor; and when the required duty cycle is less than or equal to a preset duty cycle threshold, output a signal to increase the duty cycle of the drive signal of the electric motor to the required duty cycle to the electric motor 12. The required duty cycle refers to the duty cycle of the drive signal at the time when the voltage of the electric motor 12 reaches the preset voltage value of the electric motor at the current voltage value of the battery set 30. The preset duty cycle threshold refers to the maximum value which the duty cycle of the drive signal of the electric motor 12 can reach. When the required duty cycle is not greater than the preset duty cycle threshold, the duty cycle of the drive signal of the electric motor is increased so that the electric motor 12 can reach the required duty cycle. Further, the difference parameter between the electric motor output torque of the electric motor 12 and the required torque value is less than the preset difference parameter.

In some examples, when the required duty cycle is greater than the preset duty cycle threshold, a signal to increase the duty cycle of the drive signal of the electric motor to the preset duty cycle threshold is outputted to the electric motor 12, and the signal to increase the conduction angle of the electric motor is outputted to the electric motor 12 based on the difference between the required duty cycle and the preset duty cycle threshold. When the required duty cycle is greater than the preset duty cycle threshold, it is indicated that the voltage of the electric motor 12 cannot reach the preset voltage value only through the increase in the duty cycle of the drive signal in this case. Therefore, the power of the electric motor 12 may be further increased through the increase in the conduction angle of the electric motor in this case so that the preset voltage value is reached. The greater the difference, the larger the conduction angle. A specific correspondence between the conduction angle and the difference between the required duty cycle and the preset duty cycle threshold may be preset. For example, the sizes of conduction angles at different differences causing the voltage of the electric motor 12 to reach the preset voltage value may be tested. Then, the difference and the conduction angle are associated with each other so that the specific correspondence between the difference and the conduction angle can be obtained. Since the specific correspondence may be different for different impact tools, the specific correspondence between the difference and the conduction angle is not specifically limited herein.

In some examples, the controller 17 is configured to, when the current voltage value of the battery set 30 is less than the preset voltage value of the electric motor, output the signal to increase the duty cycle of the drive signal of the electric motor to the electric motor 12 until the duty cycle of the drive signal of the electric motor reaches the preset duty cycle threshold or the difference parameter between the electric motor output torque and the required torque value is less than the preset difference parameter. When the current voltage value of the battery set 30 is less than the preset voltage value of the electric motor, it is indicated that the voltage of the electric motor 12 needs to be increased. In this case, the electric motor 12 is controlled to increase the duty cycle of the drive signal. When the difference parameter between the electric motor output torque and the required torque value is less than the preset difference parameter, it is indicated that only the duty cycle of the drive signal needs to be increased so that the electric motor output torque can be caused to be substantially the same as the required torque value. When the duty cycle of the drive signal of the electric motor reaches the preset duty cycle threshold, it is indicated that the duty cycle of the drive signal of the electric motor cannot be further increased in this case. Therefore, the duty cycle of the drive signal of the electric motor is no longer increased.

In some examples, when the duty cycle of the drive signal of the electric motor reaches the preset duty cycle threshold and the difference parameter between the electric motor output torque and the required torque value is not less than the preset difference parameter, it is indicated that the maximum power is outputted in this case, but the output torque still cannot reach preset torque. That is, the electric motor output torque cannot be caused, only through the increase in the duty cycle of the drive signal, to be substantially the same as the required torque value. Therefore, in this case, the signal to increase the conduction angle of the electric motor is outputted to the electric motor 12, and the voltage of the electric motor 12 is further increased, through the increase in the conduction angle of the electric motor, to reach the preset voltage value so that the electric motor output torque is caused to be substantially the same as the required torque value.

In some examples, the controller 17 is configured to: after the impact mechanism 15 applies the impact force to the output shaft 131, determine the required torque value of the electric motor 12; match a preset impact cycle of the impact mechanism 15 according to the required torque value; and adjust the running parameter of the electric motor according to the relationship between a current impact cycle of the impact mechanism 15 and the preset impact cycle of the impact mechanism 15 so that the difference parameter between the electric motor output torque of the electric motor 12 and the required torque value is less than the preset difference parameter at each of the different current voltages of the battery set 30.

The impact cycle is an interval between two consecutive impacts. The shorter the interval between the two impacts, the greater the provided torque. The higher rotational speed the electric motor 12 has, the shorter the impact cycle. When the impact cycle remains substantially constant, the output torque remains substantially constant. The current impact cycle refers to a current actual impact cycle of the impact mechanism 15. The preset impact cycle refers to an impact cycle which the impact mechanism 15 needs to reach. In this example, the preset impact cycle is configured to be an impact cycle required by the impact mechanism 15 when the battery set 30 provides the nominal voltage and the electric motor 12 provides the required torque value. The running parameter of the electric motor is the parameter with which the voltage of the electric motor 12 can be adjusted. In this example, the running parameter of the electric motor includes the at least one of the duty cycle of the drive signal of the electric motor and the conduction angle of the electric motor.

Since the impact cycle is related to the torque of the electric motor 12, the running parameter of the electric motor may be adjusted according to the relationship between the current impact cycle of the impact mechanism 15 and the preset impact cycle of the impact mechanism 15 so that the difference parameter between the electric motor output torque of the electric motor 12 and the required torque value is less than the preset difference parameter at each of the different current voltages of the battery set 30. Thus, the electric motor output torque does not vary with the voltage of the battery set 30, the torque output is stabilized, and the user has better use experience.

In some examples, when the battery set 30 is fully charged, impact cycles corresponding to different torque are measured in advance. In this manner, a specific correspondence between the torque value and the impact cycle is obtained. The impact cycle mentioned here refers to the preset impact cycle corresponding to the electric motor output torque. When the required torque, that is, the required torque value, is set by the user or detected, the corresponding preset impact cycle is retrieved. The running parameter of the electric motor is adjusted so that the current impact cycle is caused to be substantially the same as the preset impact cycle. Thus, the electric motor output torque of the electric motor 12 can be caused to be substantially the same as the required torque value.

When the duty cycle of the drive signal of the electric motor is fixed, the greater a load on the output shaft 131, the smaller a rotation angle of the output shaft 131. In addition, the number of rotations of the drive shaft 121 of the electric motor 12 is related to the rotation angle of the output shaft 131. Commutation information of the electric motor 12 is related to the number of rotations of the drive shaft 121 of the electric motor 12. When the impact occurs, the load on the output shaft 131 varies. Therefore, the commutation information of the electric motor 12 varies. The commutation information of the electric motor 12 includes at least one of a commutation start point, a commutation end point, or a duration required to complete each commutation. Therefore, in some examples, a variation in commutation time of the electric motor 12 is detected such that the current impact cycle of the impact mechanism 15 is obtained.

In some examples, the impact state of the impact mechanism 15 is determined through the current of the electric motor 12. In this case, the current impact cycle of the impact mechanism 15 may be obtained through the detection of a current variation. It is determined, through the current variation during the impact, whether the impact occurs. The current impact cycle is obtained through the interval between the two consecutive impacts. Specifically, the current may be detected through any one of a current sense resistor, a Hall current sensor, or a metal-oxide-semiconductor field-effect transistor (MOSFET) turn-on resistor. In other alternative examples, various physical signals, for example, electric signals and audio signals, at the time when the impact occurs are detected for determination and collection. Then, the signals are fed back to the controller 17 to determine whether the impact mechanism 15 starts impacting the output shaft 131. In some examples, the detection unit 18 determines demagnetization time by detecting a bus voltage and determines, based on the demagnetization time, whether the impact mechanism 15 starts impacting the output shaft 131. It has been fully disclosed for those skilled in the art to use the preceding method to determine that the impact mechanism 15 starts the impact, that is, the impact mechanism 15 starts applying the impact force to the output shaft 131. Therefore, the preceding description is not intended to limit the essence of the present invention.

In some examples, the controller 17 is configured to: when the current impact cycle of the impact mechanism 15 is longer than the preset impact cycle, output the signal instructing the electric motor 12 to increase the duty cycle of the drive signal of the electric motor and/or the conduction angle of the electric motor to the electric motor 12. The electric motor output torque can be increased through either the increase in the duty cycle of the drive signal of the electric motor or the increase in the conduction angle of the electric motor. When the current impact cycle of the impact mechanism 15 is longer than the preset impact cycle, it is indicated that the electric motor output torque is less than the required torque value. In this case, the electric motor output torque can be increased through the increase in the duty cycle of the drive signal of the electric motor and/or the increase in the conduction angle of the electric motor. Thus, the electric motor output torque is caused to be substantially the same as the required torque value, thereby stabilizing the torque of the electric motor 12.

In some examples, the controller 17 is configured to: when the current impact cycle of the impact mechanism 15 is longer than the preset impact cycle, calculate the required duty cycle of the electric motor 12 according to the relationship between the current impact cycle of the impact mechanism 15 and the preset impact cycle; and when the required duty cycle is not greater than the preset duty cycle threshold, output the signal to increase the duty cycle of the drive signal of the electric motor to the required duty cycle to the electric motor 12. The required duty cycle refers to the duty cycle of the drive signal of the electric motor 12 at the time when the impact mechanism 15 reaches the preset impact cycle at the current voltage value of the battery set 30. The preset duty cycle threshold refers to the maximum value which the duty cycle of the drive signal of the electric motor 12 can reach. When the required duty cycle is not greater than the preset duty cycle threshold, the duty cycle of the drive signal of the electric motor is increased so that the electric motor 12 can reach the required duty cycle. Further, the difference parameter between the electric motor output torque of the electric motor 12 and the required torque value is less than the preset difference parameter.

In some examples, when the battery set 30 is fully charged, duty cycles of the drive signal of the electric motor corresponding to different impact cycles are measured in advance. A specific correspondence between the impact cycle and the duty cycle of the drive signal of the electric motor is obtained. The duty cycle of the drive signal of the electric motor mentioned here is the required duty cycle corresponding to the preset impact cycle. Thus, when the relationship between the current impact cycle of the impact mechanism 15 and the preset impact cycle is obtained, the required duty cycle of the electric motor 12 can be calculated according to the correspondence. The duty cycle of the drive signal of the electric motor is adjusted so that the current impact cycle is caused to be substantially the same as the preset impact cycle. Thus, the electric motor output torque of the electric motor 12 can be caused to be substantially the same as the required torque value.

In some examples, when the required duty cycle is greater than the preset duty cycle threshold, the signal to increase the duty cycle of the drive signal of the electric motor to the preset duty cycle threshold is outputted to the electric motor 12, and the signal to increase the conduction angle of the electric motor is outputted to the electric motor 12 based on the difference between the required duty cycle and the preset duty cycle threshold. When the required duty cycle is greater than the preset duty cycle threshold, it is indicated that the voltage of the electric motor 12 cannot reach the preset voltage value only through the increase in the duty cycle of the drive signal in this case. Therefore, the voltage of the electric motor 12 may be further increased through the increase in the conduction angle of the electric motor in this case so that the preset voltage value is reached.

In some examples, the controller 17 is configured to, when the current impact cycle of the impact mechanism 15 is longer than the preset impact cycle, output the signal to increase the duty cycle of the drive signal of the electric motor to the electric motor 12 until the duty cycle of the drive signal of the electric motor reaches the preset duty cycle threshold or the difference parameter between the electric motor output torque and the required torque value is less than the preset difference parameter. When the current impact cycle of the impact mechanism 15 is longer than the preset impact cycle, it is indicated that the torque of the electric motor 12 needs to be increased. In this case, the electric motor 12 is controlled to increase the duty cycle of the drive signal of the electric motor. When the difference parameter between the electric motor output torque and the required torque value is less than the preset difference parameter, it is indicated that the torque has been stably outputted. In addition, it is indicated that only the duty cycle of the drive signal of the electric motor needs to be increased so that the electric motor output torque can be caused to be substantially the same as the required torque value. It is unnecessary to further increase the duty cycle of the drive signal of the electric motor. When the duty cycle of the drive signal of the electric motor reaches the preset duty cycle threshold, it is indicated that the duty cycle of the drive signal of the electric motor cannot be further increased in this case. Therefore, the duty cycle of the drive signal of the electric motor is no longer increased.

In some examples, when the duty cycle of the drive signal of the electric motor reaches the preset duty cycle threshold and the difference parameter between the electric motor output torque and the required torque value is not less than the preset difference parameter, it is indicated that the electric motor output torque cannot be caused, only through the increase in the duty cycle of the drive signal of the electric motor, to be substantially the same as the required torque value. Therefore, in this case, the signal to increase the conduction angle of the electric motor is outputted to the electric motor 12, and the voltage of the electric motor 12 is further increased, through the increase in the conduction angle of the electric motor, to reach the preset voltage value so that the electric motor output torque is caused to be substantially the same as the required torque value.

In some examples, the controller 17 is configured to: after the impact mechanism 15 applies the impact force to the output shaft 131, determine the required torque value of the electric motor 12; match a preset value of a first parameter value of the impact mechanism 15 and a preset value of a second parameter value of the impact mechanism 15 according to the required torque value; adjust the running parameter of the electric motor according to the relationship between a current first parameter value and the preset value of the first parameter value and correct, according to the relationship between a current second parameter value and the preset value of the second parameter value, the running parameter of the electric motor adjusted according to the first parameter value so that the difference parameter between the electric motor output torque of the electric motor 12 and the required torque value is less than the preset difference parameter at each of the different current voltages of the battery set 30.

The first parameter value and the second parameter value are parameters related to the torque value of the electric motor 12. The preset value of the first parameter value is a first parameter value of the impact mechanism 15 at the time when the electric motor 12 outputs the required torque value. The preset value of the second parameter value is a second parameter value of the impact mechanism 15 at the time when the electric motor 12 outputs the required torque value. Therefore, the running parameter of the electric motor is adjusted according to the relationship between the current first parameter value and the preset value of the first parameter value, the running parameter of the electric motor adjusted according to the first parameter value is corrected according to the relationship between the current second parameter value and the preset value of the second parameter value, and running is performed with the corrected running parameter of the electric motor so that the electric motor output torque can be caused to be substantially the same as the required torque value. Thus, the electric motor output torque of the electric motor 12 is substantially the same at the different current voltages of the battery set 30, and the torque output can be stabilized.

In some examples, the first parameter value includes a voltage-related parameter, for example, the voltage of the electric motor 12, and the second parameter value is the impact cycle of the impact mechanism 15. The voltage can be detected in real time, but the impact cycle needs to last for a period of time before it can be detected. Therefore, the output torque of the electric motor 12 is adjusted, according to the relationship between a current value of the voltage of the electric motor 12 and a preset value of the voltage of the electric motor 12, to approximate to the required torque value. Then, the difference parameter between the output torque of the electric motor 12 and the required torque value is caused, according to the relationship between a current value of the impact cycle and a preset value of the impact cycle, to be less than the preset difference parameter. In this manner, the electric motor output torque can be quickly adjusted to approximate to the required torque value, and then the electric motor output torque is stabilized to be substantially the same as the required torque value. Thus, the electric motor output torque does not vary with the voltage of the battery set 30, the torque output can be stabilized, and the user has better use experience.

Figure 4:
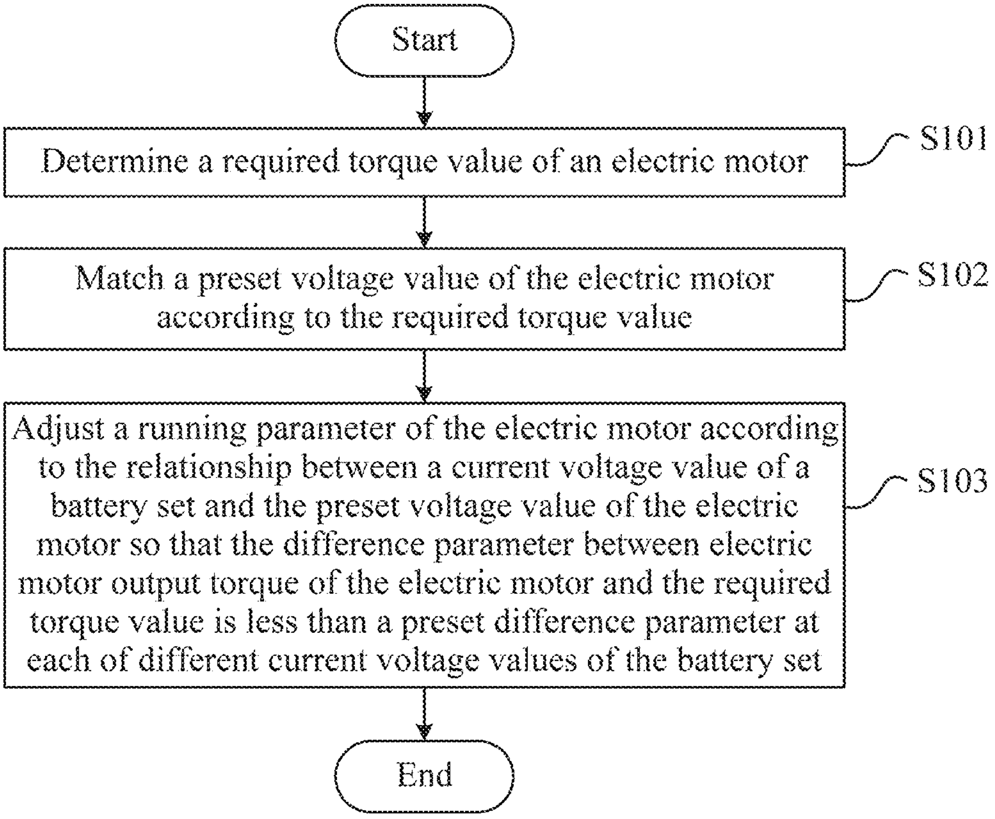
FIG. 4 is a control flowchart of an impact tool according to an example of the present application.

Referring to a control flowchart of the impact tool in the preceding examples shown in FIG. 4, the following steps are specifically included.

In S101, the required torque value of the electric motor is determined.

In S102, the preset voltage value of the electric motor is matched according to the required torque value.

In S103, the running parameter of the electric motor is adjusted according to the relationship between the current voltage value of the battery set and the preset voltage value of the electric motor so that the difference parameter between the electric motor output torque of the electric motor and the required torque value is less than the preset difference parameter at each of the different current voltage values of the battery set.

Figure 5:
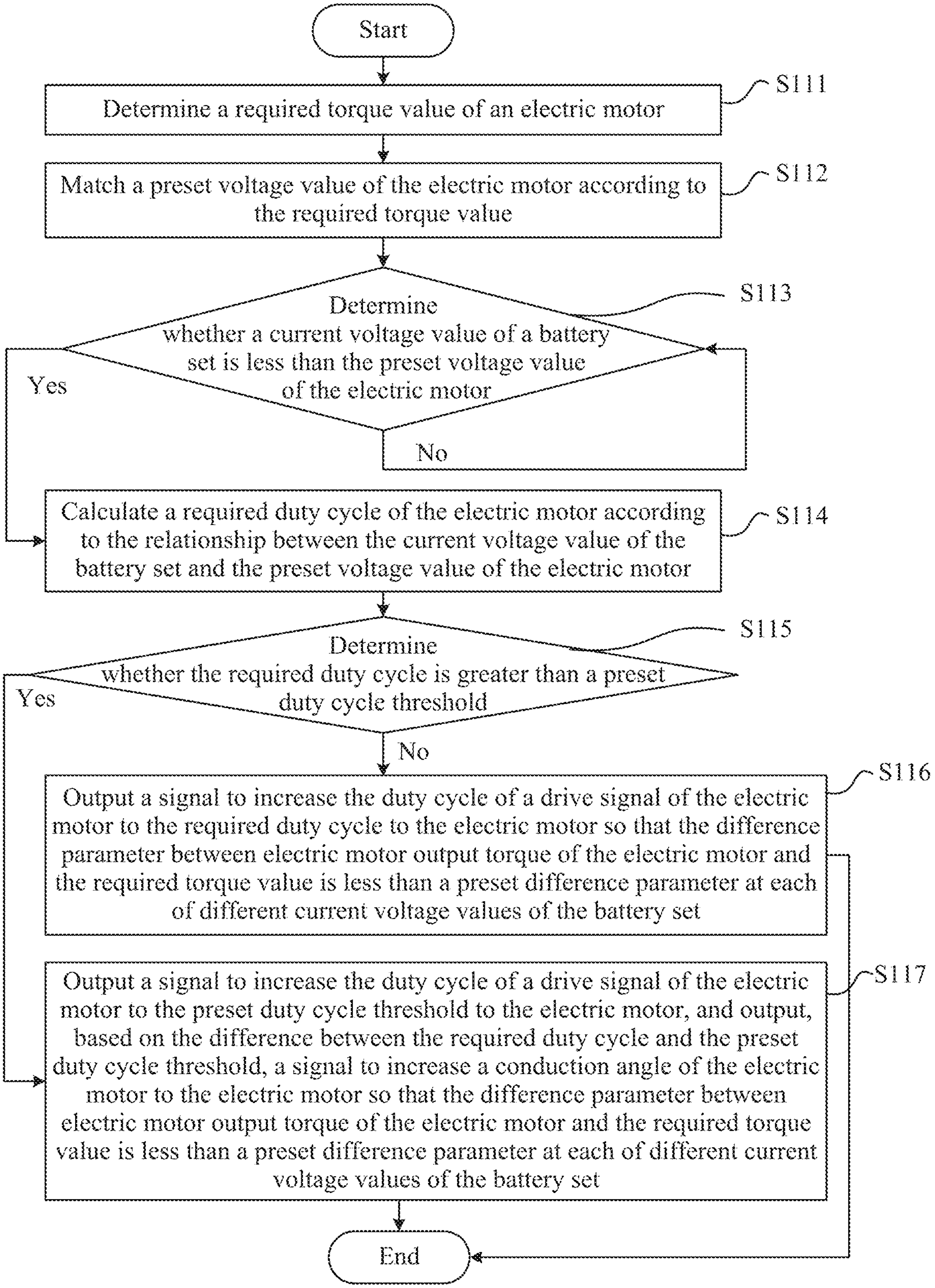
FIG. 5 is a control flowchart of an impact tool according to another example of the present application.

In some examples, as shown in FIG. 5, a control flowchart of the impact tool in the preceding examples specifically includes the following steps.

In S111, the required torque value of the electric motor is determined.

In S112, the preset voltage value of the electric motor is matched according to the required torque value.

In S113, it is determined whether the current voltage value of the battery set is less than the preset voltage value of the electric motor. If the current voltage value of the battery set is less than the preset voltage value of the electric motor, step S114 is performed. If the current voltage value of the battery set is not less than the preset voltage value of the electric motor, step S113 is performed again.

In S114, the required duty cycle of the electric motor is calculated according to the relationship between the current voltage value of the battery set and the preset voltage value of the electric motor.

In S115, it is determined whether the required duty cycle is greater than the preset duty cycle threshold. If the required duty cycle is not greater than the preset duty cycle threshold, step S116 is performed. If the required duty cycle is greater than the preset duty cycle threshold, step S117 is performed.

In S116, the signal to increase the duty cycle of the drive signal of the electric motor to the required duty cycle is outputted to the electric motor so that the difference parameter between the electric motor output torque of the electric motor and the required torque value is less than the preset difference parameter at each of the different current voltage values of the battery set.

In S117, the signal to increase the duty cycle of the drive signal of the electric motor to the preset duty cycle threshold is outputted to the electric motor, and the signal to increase the conduction angle of the electric motor is outputted to the electric motor based on the difference between the required duty cycle and the preset duty cycle threshold so that the difference parameter between the electric motor output torque of the electric motor and the required torque value is less than the preset difference parameter at each of the different current voltage values of the battery set.

Figure 6:
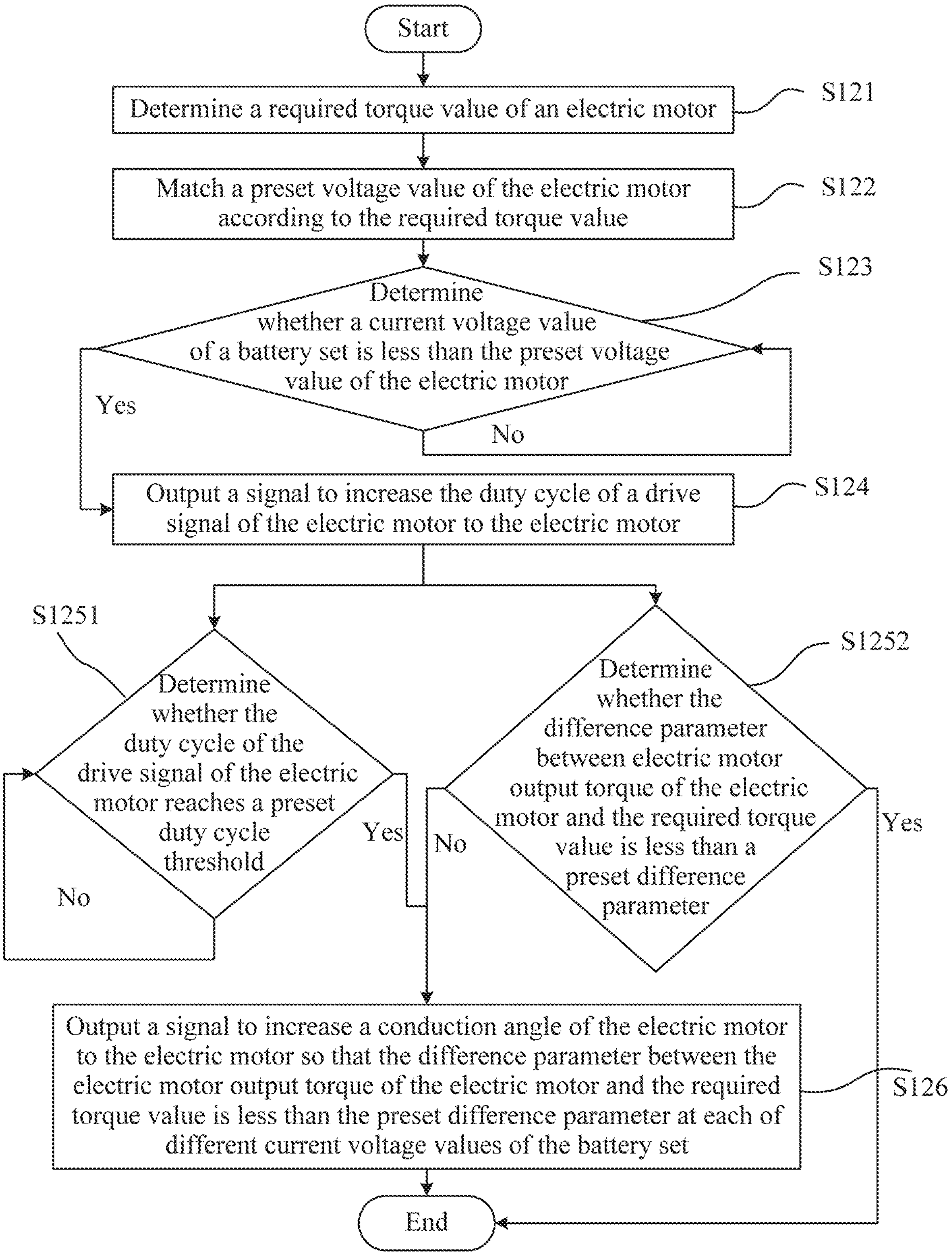
FIG. 6 is a control flowchart of an impact tool according to another example of the present application.

In some examples, as shown in FIG. 6, a control flowchart of the impact tool in the preceding examples specifically includes the following steps.

In S121, the required torque value of the electric motor is determined.

In S122, the preset voltage value of the electric motor is matched according to the required torque value.

In S123, it is determined whether the current voltage value of the battery set is less than the preset voltage value of the electric motor. If the current voltage value of the battery set is less than the preset voltage value of the electric motor, step S124 is performed. If the current voltage value of the battery set is not less than the preset voltage value of the electric motor, step S123 is performed again.

In S124, the signal to increase the duty cycle of the drive signal of the electric motor is outputted to the electric motor.

In S1251, it is determined whether the duty cycle of the drive signal of the electric motor reaches the preset duty cycle threshold.

In S1252, it is determined whether the difference parameter between the electric motor output torque of the electric motor and the required torque value is less than the preset difference parameter.

If the duty cycle of the drive signal of the electric motor reaches the preset duty cycle threshold and the difference parameter between the electric motor output torque and the required torque value is not less than the preset difference parameter, step S126 is performed. If the difference parameter between the electric motor output torque and the required torque value is less than the preset difference parameter, the flow is ended.

In S126, the signal to increase the conduction angle of the electric motor is outputted to the electric motor so that the difference parameter between the electric motor output torque of the electric motor and the required torque value is less than the preset difference parameter at each of the different current voltage values of the battery set.

Figure 7:
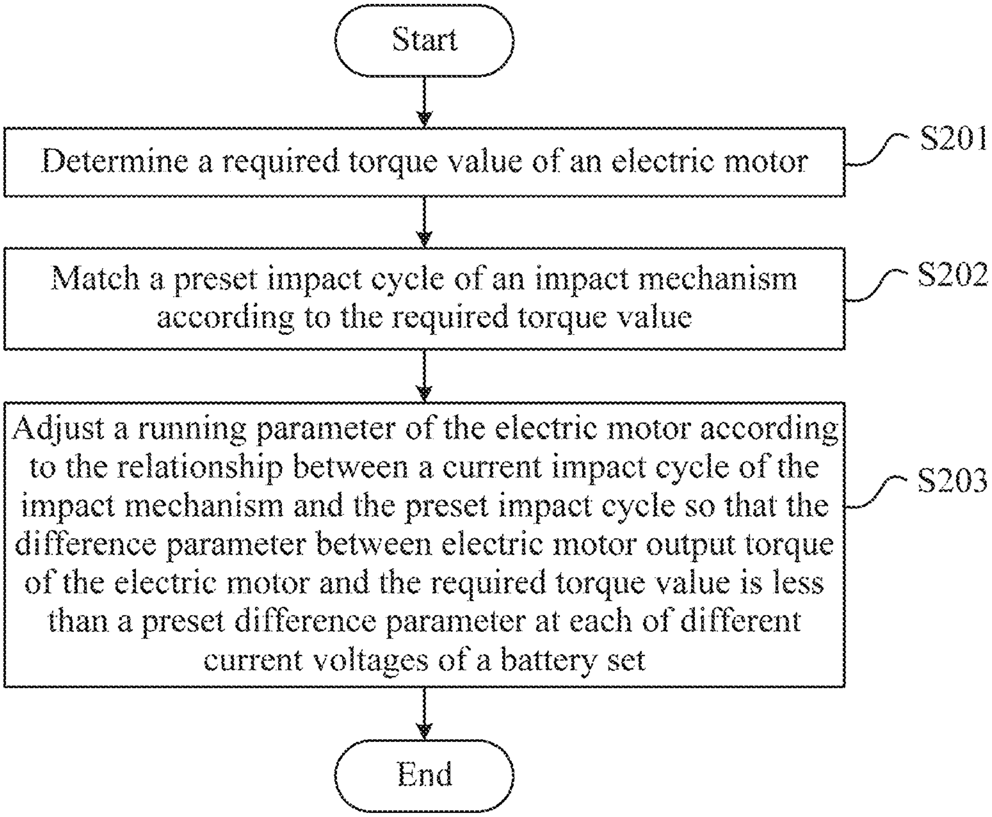
FIG. 7 is a control flowchart of an impact tool according to another example of the present application.

In some examples, as shown in FIG. 7, a control flowchart of the impact tool in the preceding examples specifically includes the following steps.

In S201, the required torque value of the electric motor is determined.

In S202, the preset impact cycle of the impact mechanism is matched according to the required torque value.

In S203, the running parameter of the electric motor is adjusted according to the relationship between the current impact cycle of the impact mechanism and the preset impact cycle so that the difference parameter between the electric motor output torque of the electric motor and the required torque value is less than the preset difference parameter at each of the different current voltages of the battery set.

Figure 8:
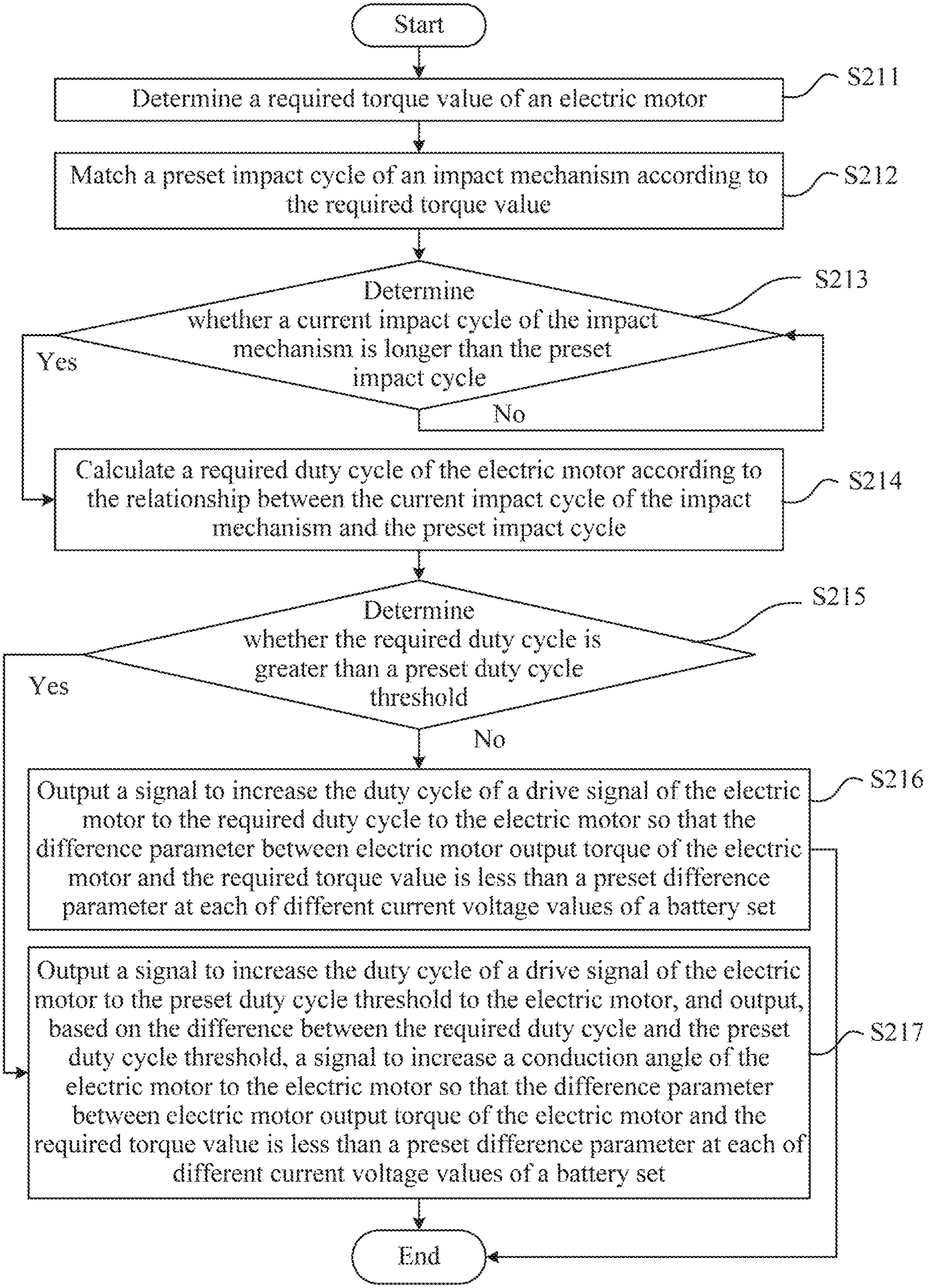
FIG. 8 is a control flowchart of an impact tool according to another example of the present application.

In some examples, as shown in FIG. 8, a control flowchart of the impact tool in the preceding examples specifically includes the following steps.

In S211, the required torque value of the electric motor is determined.

In S212, the preset impact cycle of the impact mechanism is matched according to the required torque value.

In S213, it is determined whether the current impact cycle of the impact mechanism is longer than the preset impact cycle. If the current impact cycle of the impact mechanism is longer than the preset impact cycle, step S214 is performed. If the current impact cycle of the impact mechanism is not longer than the preset impact cycle, step S213 is performed again.

In S214, the required duty cycle of the electric motor is calculated according to the relationship between the current impact cycle of the impact mechanism and the preset impact cycle.

In S215, it is determined whether the required duty cycle is greater than the preset duty cycle threshold. If the required duty cycle is not greater than the preset duty cycle threshold, step S216 is performed. If the required duty cycle is greater than the preset duty cycle threshold, step S217 is performed.

In S216, the signal to increase the duty cycle of the drive signal of the electric motor to the required duty cycle is outputted to the electric motor so that the difference parameter between the electric motor output torque of the electric motor and the required torque value is less than the preset difference parameter at each of the different current voltage values of the battery set.

In S217, the signal to increase the duty cycle of the drive signal of the electric motor to the preset duty cycle threshold is outputted to the electric motor, and the signal to increase the conduction angle of the electric motor is outputted to the electric motor based on the difference between the required duty cycle and the preset duty cycle threshold so that the difference parameter between the electric motor output torque of the electric motor and the required torque value is less than the preset difference parameter at each of the different current voltage values of the battery set.

Figure 9:
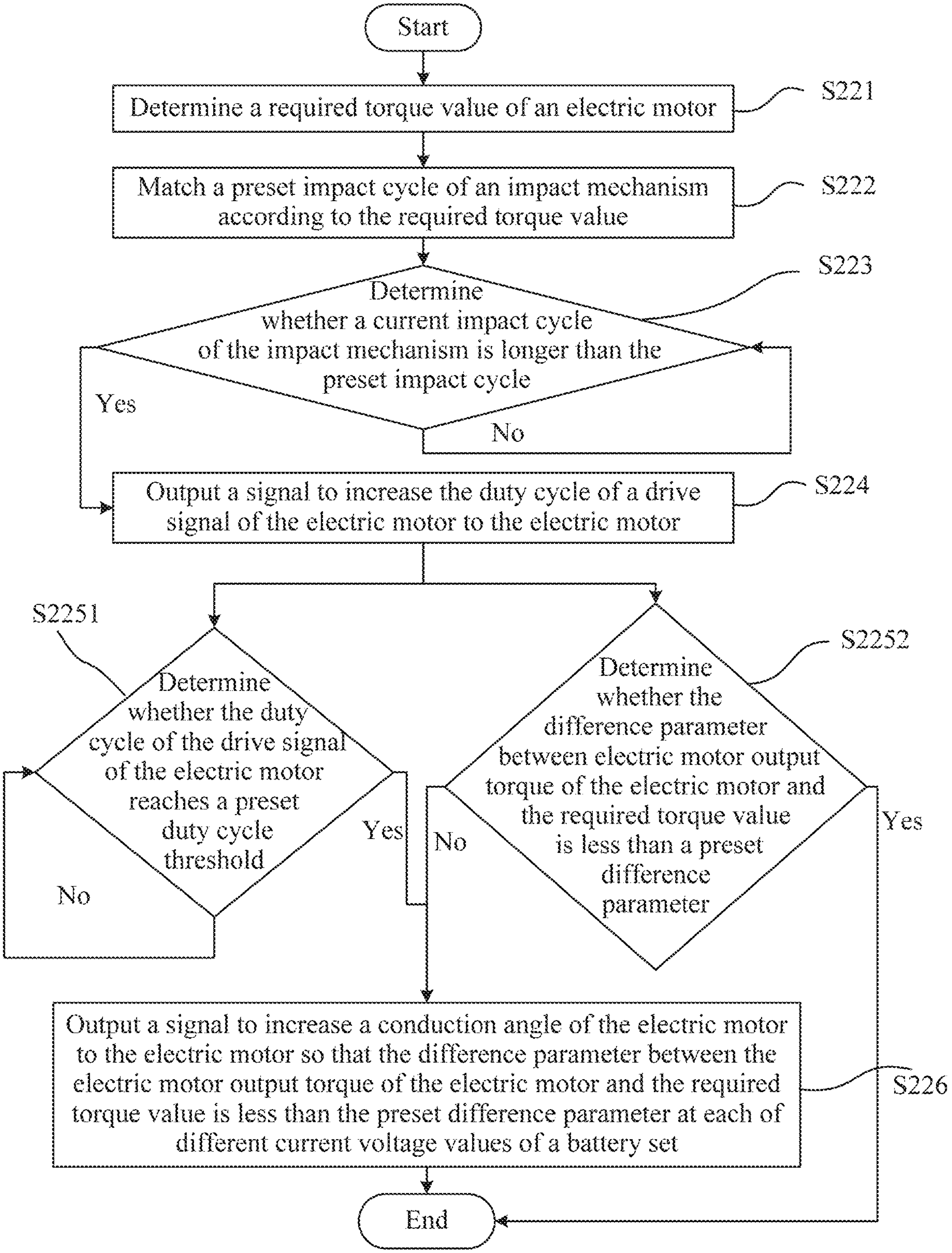
FIG. 9 is a control flowchart of an impact tool according to another example of the present application.

In some examples, as shown in FIG. 9, a control flowchart of the impact tool in the preceding examples specifically includes the following steps.

In S221, the required torque value of the electric motor is determined.

In S222, the preset impact cycle of the impact mechanism is matched according to the required torque value.

In S223, it is determined whether the current impact cycle of the impact mechanism is longer than the preset impact cycle. If the current impact cycle of the impact mechanism is longer than the preset impact cycle, step S224 is performed. If the current impact cycle of the impact mechanism is not longer than the preset impact cycle, step S223 is performed again.

In S224, the signal to increase the duty cycle of the drive signal of the electric motor is outputted to the electric motor.

In S2251, it is determined whether the duty cycle of the drive signal of the electric motor reaches the preset duty cycle threshold.

In S2252, it is determined whether the difference parameter between the electric motor output torque of the electric motor and the required torque value is less than the preset difference parameter.

If the duty cycle of the drive signal of the electric motor reaches the preset duty cycle threshold and the difference parameter between the electric motor output torque and the required torque value is not less than the preset difference parameter, step S226 is performed. If the difference parameter between the electric motor output torque and the required torque value is less than the preset difference parameter, the flow is ended. If the duty cycle of the drive signal of the electric motor does not reach the preset duty cycle threshold and the difference parameter between the electric motor output torque and the required torque value is not less than the preset difference parameter, step S224 is performed again.

In S226, the signal to increase the conduction angle of the electric motor is outputted to the electric motor so that the difference parameter between the electric motor output torque of the electric motor and the required torque value is less than the preset difference parameter at each of the different current voltage values of the battery set.

Figure 10:
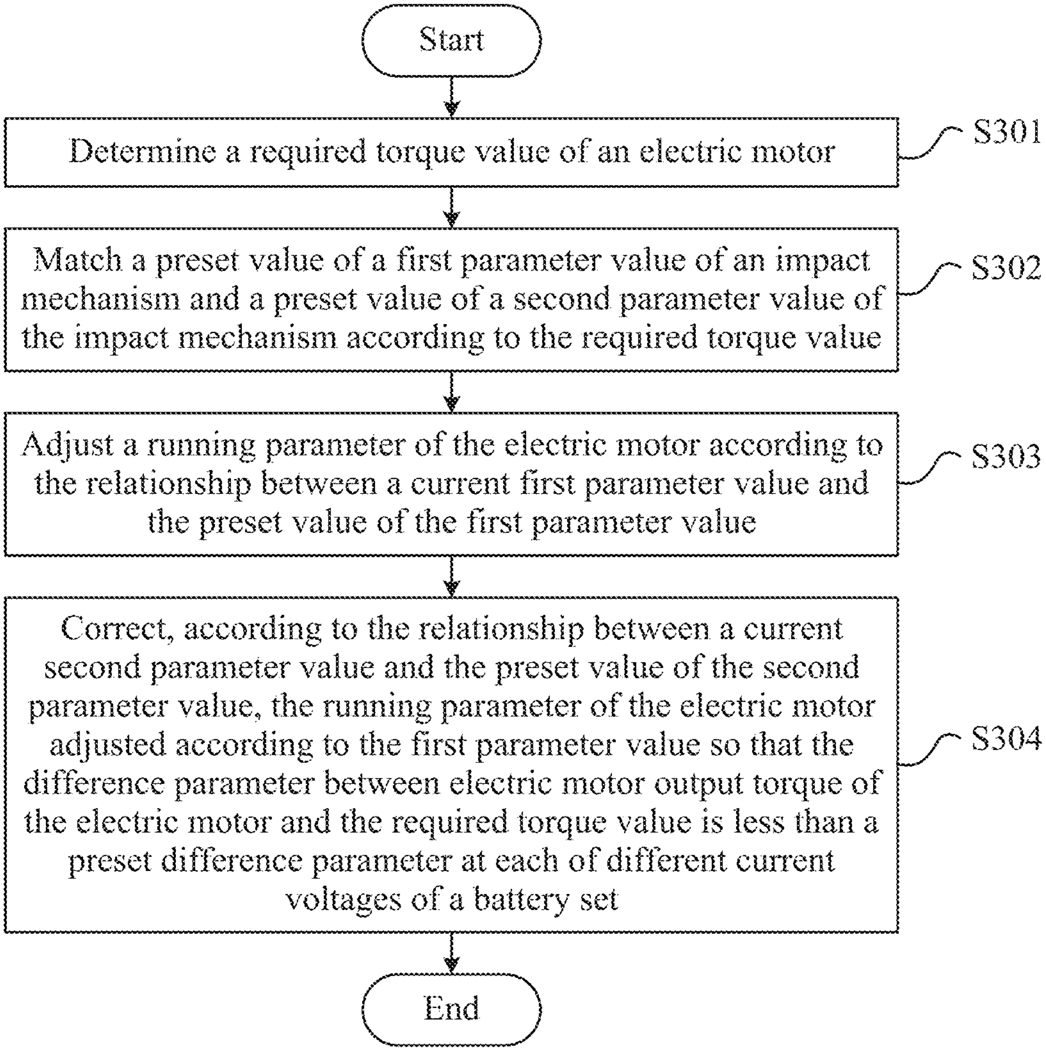
FIG. 10 is a control flowchart of an impact tool according to another example of the present application.

Referring to a control flowchart of the impact tool in the preceding examples shown in FIG. 10, the following steps are specifically included.

In S301, the required torque value of the electric motor is determined.

In S302, the preset value of the first parameter value of the impact mechanism and the preset value of the second parameter value of the impact mechanism are matched according to the required torque value.

In S303, the running parameter of the electric motor is adjusted according to the relationship between the current first parameter value and the preset value of the first parameter value.

In S304, the running parameter of the electric motor adjusted according to the first parameter value is corrected according to the relationship between the current second parameter value and the preset value of the second parameter value so that the difference parameter between the electric motor output torque of the electric motor and the required torque value is less than the preset difference parameter at each of the different current voltages of the battery set.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:

an electric motor comprising a drive shaft rotating about a first axis and outputting a torque via the drive shaft;

a battery set powering at least the electric motor;

an output shaft for outputting the torque;

an impact mechanism for applying an impact force to the output shaft, wherein the impact mechanism comprises an impact block driven by the drive shaft and a hammer anvil impacted by the impact block, and the hammer anvil is formed with or connected to the output shaft; and a controller configured to control the electric motor;

wherein the controller is configured to:

after the impact mechanism applies the impact force to the output shaft, determine a required torque value of the electric motor;

match a preset voltage value of the electric motor in response to the required torque value; and adjust a running parameter of the electric motor according to a relationship between the preset voltage value of the electric motor and a current voltage value of the battery set so that a difference parameter between an electric motor output torque of the electric motor and the required torque value is less than a preset difference parameter at each of different current voltage values of the battery set, wherein the controller is further configured to: when the current voltage value of the battery set is less than the preset voltage value of the electric motor, output a signal instructing the electric motor to increase a duty cycle of a drive signal of the electric motor; and when the duty cycle of the drive signal of the electric motor reaches a preset duty cycle threshold and the difference parameter between the electric motor output torque and the required torque value is greater than or equal to the preset difference parameter, output the signal to increase a conduction angle of the electric motor to the electric motor.

2. The impact tool according to claim 1, wherein the controller is configured to: when the current voltage value of the battery set is less than the preset voltage value of the electric motor, calculate a required duty cycle of the electric motor according to the relationship between the current voltage value of the battery set and the preset voltage value of the electric motor; and, when the required duty cycle is less than or equal to the preset duty cycle threshold, output the signal to increase the duty cycle of the drive signal of the electric motor to the required duty cycle to the electric motor.

3. The impact tool according to claim 2, wherein the controller is configured to: when the required duty cycle is greater than the preset duty cycle threshold, output the signal to increase the duty cycle of the drive signal of the electric motor to the preset duty cycle threshold to the electric motor; and then output the signal to increase the conduction angle of the electric motor to the electric motor based on a difference between the required duty cycle and the preset duty cycle threshold.

4. The impact tool according to claim 1, wherein the preset voltage value of the electric motor is a voltage of the electric motor at a time when the battery set provides a nominal voltage and the electric motor provides the required torque value.

5. The impact tool according to claim 1, wherein the difference parameter comprises a ratio of a difference between the electric motor output torque at the current voltage value and the required torque value to the required torque value.

6. The impact tool according to claim 5, wherein the preset difference parameter is 20%.

7. The impact tool according to claim 1, wherein the controller is configured to: match a preset impact cycle of the impact mechanism in response to the required torque value; and correct, according to a relationship between a current impact cycle of the impact mechanism and the preset impact cycle of the impact mechanism, the running parameter of the electric motor adjusted according to the relationship between the preset voltage value of the electric motor and the current voltage value of the battery set.

8. The impact tool according to claim 7, wherein the impact cycle is an interval between two consecutive impacts.

9. The impact tool according to claim 7, wherein the preset impact cycle is defined as an impact cycle required by the impact mechanism when the battery set provides a nominal voltage and the electric motor provides the required torque value.

10. The impact tool according to claim 7, wherein the controller is configured to: when the current impact cycle of the impact mechanism is longer than the preset impact cycle, output the signal instructing the electric motor to increase at least one of the duty cycle of the drive signal of the electric motor or the conduction angle of the electric motor to the electric motor.

11. The impact tool according to claim 10, wherein the controller is configured to: calculate a required duty cycle of the electric motor according to the relationship between the current impact cycle of the impact mechanism and the preset impact cycle; when the required duty cycle is greater than the preset duty cycle threshold, output the signal to increase the duty cycle of the drive signal of the electric motor to the preset duty cycle threshold to the electric motor; and output, based on a difference between the required duty cycle and the preset duty cycle threshold, the signal to increase the conduction angle of the electric motor to the electric motor.

12. An impact tool, comprising:

an electric motor comprising a drive shaft rotating about a first axis and outputting a torque via the drive shaft;

a battery set powering at least the electric motor;

an output shaft for outputting the torque to an outside;

an impact mechanism for applying an impact force to the output shaft, wherein the impact mechanism comprises an impact block driven by the drive shaft and a hammer anvil impacted by the impact block, and the hammer anvil is formed with or connected to the output shaft; and a controller configured to control the electric motor;

wherein the controller is further configured to: p2 after the impact mechanism applies the impact force to the output shaft, determine a required torque value of the electric motor, wherein a ratio of a difference between the output torque of the electric motor and the required torque value to the required torque value is lower than 20% at each of different current voltage values of the battery set, wherein the controller is configured to: match a preset voltage value of the electric motor in response to the required torque value; when the current voltage value of the battery set is less than the preset voltage value of the electric motor, output a signal instructing the electric motor to increase a conduction angle of the electric motor to the electric motor.

13. An impact tool, comprising:

an electric motor comprising a drive shaft rotating about a first axis and outputting a torque via the drive shaft;

a battery set powering at least the electric motor;

an output shaft for outputting the torque;

an impact mechanism for applying an impact force to the output shaft; and a controller configured to control the electric motor;

wherein the controller is configured to:

after the impact mechanism applies the impact force to the output shaft, determine a required torque value of the electric motor;

match a preset value of a first parameter value of the impact mechanism and a preset value of a second parameter value of the impact mechanism in response to the required torque value;

adjust a running parameter of the electric motor according to a relationship between a current first parameter value and the preset value of the first parameter value;

correct, according to a relationship between a current second parameter value and the preset value of the second parameter value, the running parameter of the electric motor adjusted according to the relationship between the current first parameter value and the preset value of the first parameter value; and perform running with the corrected running parameter of the electric motor so that a difference parameter between the electric motor output torque of the electric motor and the required torque value is less than a preset difference parameter at each of different current voltage values of the battery set, wherein the running parameter of the electric motor comprises a conduction angle of the electric motor.

14. The impact tool according to claim 13, wherein the first parameter value comprises a voltage parameter, and the second parameter value comprises an impact cycle of the impact mechanism.

15. The impact tool according to claim 13, wherein the preset difference parameter is 20%.

* * * * *